US010506073B1

(12) United States Patent
Mason et al.

(10) Patent No.: US 10,506,073 B1
(45) Date of Patent: Dec. 10, 2019

(54) DETERMINATION OF PRESENCE DATA BY DEVICES

(71) Applicant: AMAZON TECHNOLOGIES, INC., Seattle, WA (US)

(72) Inventors: Todd Christopher Mason, Danville, CA (US); Richard William Mincher, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/702,335

(22) Filed: Sep. 12, 2017

Related U.S. Application Data

(63) Continuation of application No. 14/929,118, filed on Oct. 30, 2015, now Pat. No. 9,769,283, which is a continuation of application No. 13/865,528, filed on Apr. 18, 2013, now Pat. No. 9,224,290.

(51) Int. Cl.
*G08C 17/02* (2006.01)
*H04L 29/08* (2006.01)
*H04W 4/02* (2018.01)
*H04W 8/00* (2009.01)

(52) U.S. Cl.
CPC ........... *H04L 67/322* (2013.01); *H04W 4/023* (2013.01); *H04W 8/005* (2013.01)

(58) Field of Classification Search
CPC ....... H04N 21/44218; H04N 21/44213; H04N 21/44222; H04L 67/322; H04L 29/08684; H04L 51/043; H04L 63/0492; H04W 4/023; H04W 8/005; G08B 21/22
USPC ....... 340/12.5, 539.23; 725/9, 10, 11, 12, 14
See application file for complete search history.

(56) References Cited

U.S. PATENT DOCUMENTS

| 5,550,928 | A  | * | 8/1996  | Lu ...................... G06K 9/00221 382/103 |
| 5,793,409 | A  | * | 8/1998  | Tetsumura ............ G01S 15/025 725/10 |
| 6,631,271 | B1 | * | 10/2003 | Logan ..................... G06F 3/002 340/539.13 |
| 8,363,086 | B1 | * | 1/2013  | Shah ..................... H04L 67/141 348/14.02 |
| 9,224,290 | B1 | * | 12/2015 | Mason ................... G08C 17/02 |
| 9,769,283 | B1 | * | 9/2017  | Mason ................... G08C 17/02 |
| 2003/0052911 | A1 | | 3/2003 | Cohen-Solal |
| 2004/0186909 | A1 | * | 9/2004 | Greenwood ............ H04L 51/04 709/227 |
| 2005/0254505 | A1 | * | 11/2005 | Chang ..................... H04L 67/12 370/401 |

(Continued)

OTHER PUBLICATIONS

Holloway III, Edwin C., "Non-Final Office Action dated Apr. 2, 2015", U.S. Appl. No. 13/865,528, The United States Patent and Trademark Office, Apr. 2, 2015.

(Continued)

*Primary Examiner* — Edwin C Holloway, III
(74) *Attorney, Agent, or Firm* — Lindauer Law, PLLC

(57) ABSTRACT

Described are techniques for determining proximity data indicative of the presence, absence, location, position, or orientation of one or more users relative to one or more devices. Based on the proximity data, a corresponding function may be determined, such as initiating or receiving of a communication with another device, ceasing an existing communication, performing a maintenance function, or entering a lower power state.

20 Claims, 11 Drawing Sheets

(56) References Cited

U.S. PATENT DOCUMENTS

| | | | |
|---|---|---|---|
| 2006/0210034 A1* | 9/2006 | Beadle .................. | G06Q 10/107 379/88.22 |
| 2007/0157220 A1 | 7/2007 | Cordray et al. | |
| 2007/0186228 A1 | 8/2007 | Ramaswamy et al. | |
| 2007/0260730 A1* | 11/2007 | Gadwale ............... | H04L 51/043 709/224 |
| 2008/0052624 A1* | 2/2008 | Roberts ................ | H04N 5/4403 715/716 |
| 2010/0042235 A1 | 2/2010 | Basso et al. | |
| 2012/0060176 A1* | 3/2012 | Chai ...................... | H04H 60/45 725/10 |
| 2013/0332934 A1* | 12/2013 | Hood, Jr. .............. | G06F 9/4494 718/102 |
| 2014/0130073 A1* | 5/2014 | Yu ..................... | H04N 21/44222 725/14 |

OTHER PUBLICATIONS

Holloway III, Edwin C., "Notice of Allowance dated Aug. 25, 2015", U.S. Appl. No. 13/865,528, The United States Patent and Trademark Office, Aug. 25, 2015.

Holloway III, Edwin C., "Notice of Allowance dated May 26, 2017", U.S. Appl. No. 14/929,118, The United States Patent and Trademark Office, May 26, 2017.

Holloway III, Edwin C., "Non-final Office Action dated Jan. 18, 2017", U.S. Appl. No. 14/929,118, The United States Patent and Trademark Office, Jan. 18, 2017.

\* cited by examiner

| USER PROXIMITY DATA 124 ||||||
|---|---|---|---|---|
| DATA ID 202 | DEVICE ID 204 | SENSORS AVAILABLE 206 | OUTPUT 208 | LAST UPDATED 210 |
| 202(1) | 108(1) | Wi-Fi™ detection of user device | User device detected | 60 s |
| 202(2) | 108(2) | Infrared proximity/motion sensor | Detected 3 meters | 10 s |
| 202(3) | 108(3) | Camera, infrared proximity | 3 users | 240 s |
| 202(4) | 108(4) | Range camera | 2 users within 6 meters, seated | 2 s |
| 202(5) | 108(5) | Camera, NFC reader | User 102(1) "Alice" | 20 s |

FIG. 2

| | PROXIMITY ACTION DATA 130 | |
|---|---|---|
| ACTION ID 302 | USER PROXIMITY STATES 304 | PROXIMITY INSTRUCTIONS(S) 306 |
| 302(1) | Proximate user detected | Stream audio and video content |
| 302(2) | Proximate user no longer detected | Discontinue video stream of content, maintain audio stream of content |
| 302(3) | Proximate user no longer detected for at least 20 minutes | Begin media device maintenance tasks, present static user interface |
| 302(4) | Proximate user detected | Discontinue maintenance tasks, present interactive user interface |
| 302(5) | No proximate user detected | Discontinue streaming at server, send commands to transition one or more other devices from a normal operating state into a low power state, transition media device to low power state |
| 302(6) | Proximate user detected | Transition to normal operating state, send commands to one or more other devices to transition to normal operating state, resume streaming |
| 302(7) | Proximate user detected | Initiate video chat with predetermined recipient |
| 302(8) | User 102(1) "Alice" detected | Initiate video chat with recipient user 102(2) "Bob" |
| 302(9) | Multiple users detected | Increase service delivery priority of streamed content (may be based at least in part on the number of users) |
| 302(10) | Additional user detected | generate bookmark in content being presented at time additional user detected |
| 302(11) | First user present and seated, second user detected and standing | Initiate captioning of the content |
| ⋮ | | |
| 302(A) | ... | ... |

FIG. 3

DETERMINATION OF PRESENCE DATA BY DEVICES

PRIORITY

This application is a continuation of, and claims priority to, pending U.S. patent application Ser. No. 14/929,118, filed Oct. 30, 2015, entitled "Presence-Based Device Operation". application Ser. No. 14/929,118 is incorporated by reference herein in its entirety.

Application Ser. No. 14/929,118 is a continuation of, and claims priority to, U.S. patent application Ser. No. 13/865,528, filed on Apr. 18, 2013, entitled "Presence-Based Device Operation", now issued as U.S. Pat. No. 9,224,290. Application Ser. No. 13/865,528 is incorporated by reference herein in its entirety.

BACKGROUND

A wide variety of media devices are available for users to consume an ever growing selection of content. These media devices may include televisions, tablet computers, personal computers, electronic book readers, gaming consoles, set-top boxes, media players, portable media players, smartphones, and so forth. Each of these devices may have various functions which may be controlled.

BRIEF DESCRIPTION OF DRAWINGS

FIG. 2 is a block diagram of user proximity data which is indicative of the presence or absence of one or more users proximate to a device such as a remote control or a set-top box.

FIG. 3 is a block diagram of proximity action data which associates user proximity data with particular proximity instructions.

Figure 1:
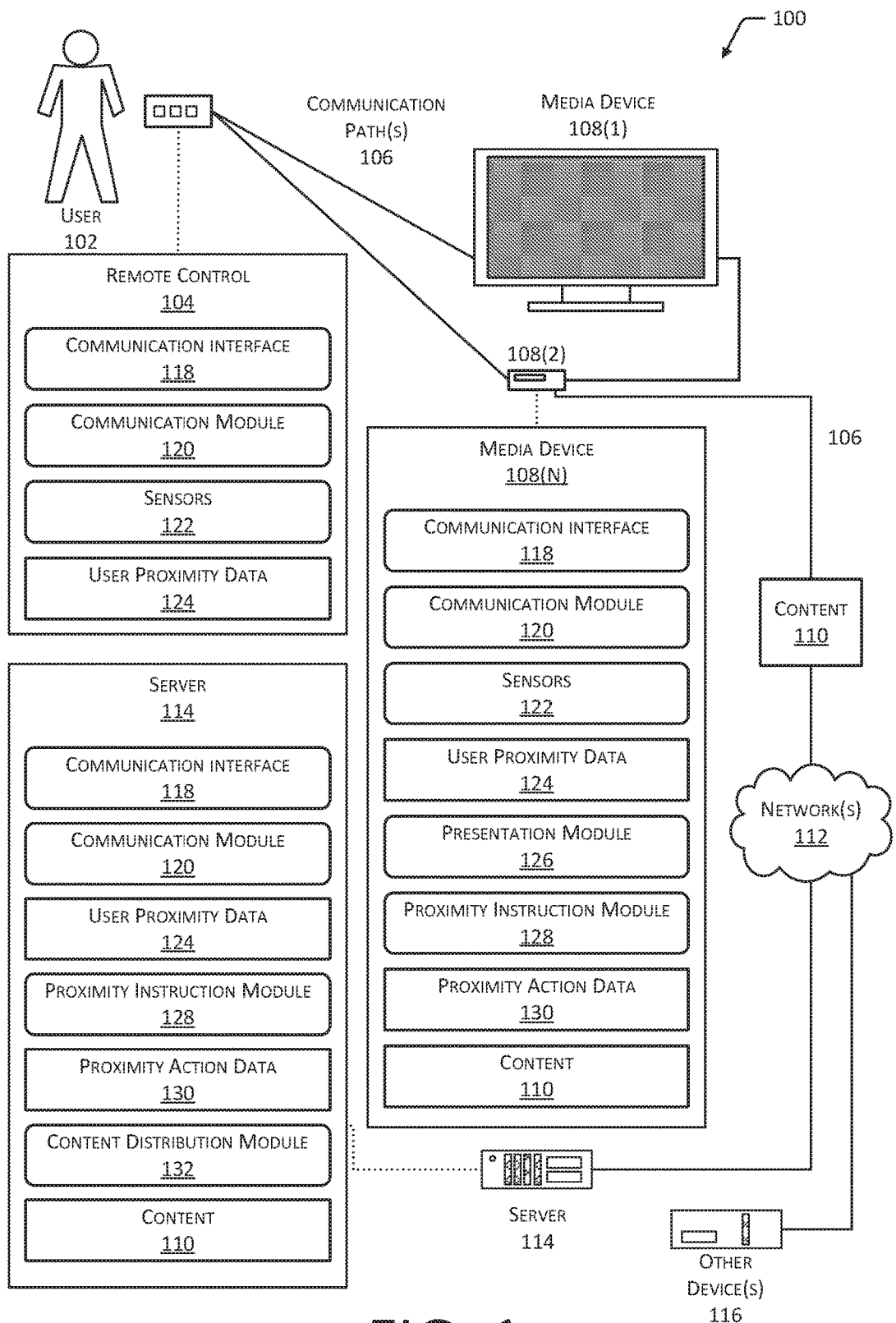
FIG. 1 is an illustrative system of operating a device based at least in part on user proximity data gathered from one or more sensors.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout. For ease of reference, the first numeral in each reference number indicates the first figure in which that reference number appears.

DETAILED DESCRIPTION

The wide variety of media devices available to facilitate consumption of content by users result in a large number of input options. Traditionally, users have had to use remote controls or press buttons on these devices to change presentation of content, modify device operation such as turning devices on or off, and so forth. This may result in a negative user experience, as users have to use the remote control, issue a speech command, touch the media device, and so forth to effect changes on the media devices.

Described in this application are devices and techniques which configure one or more of a remote control device, media device, or server based at least in part on user proximity data. User proximity is determined by acquiring data from one or more sensors which is indicative of physical nearness such as presence or absence of a user near the remote control device, the media device, or both. For example, a capacitive proximity sensor in the remote control device may provide data indicative of the user holding the remote control. In another example, an optical proximity sensor in the media device may use pulses of infrared light to determine when the user is near the sensor.

The user proximity data may be provided to the server. The server may compare at least a portion of the user proximity data with proximity action data. The proximity action data associates particular user proximity data with particular proximity instructions. For example, user proximity data indicative of no users near the media device may be associated with the proximity instruction to discontinue streaming of content to the media device. In another example, the user proximity data indicative of the user near the media device may be associated with the proximity instruction to establish a video chat.

The server may provide instructions to the devices for execution such as the remote control, the media device, or both. For example, based on the user proximity data indicating that the user is absent, the server may send proximity instructions to the media device to run device maintenance tasks and then enter a low power state. The media device may execute these proximity instructions, performing the maintenance tasks and then entering the low power state.

Upon the user's return to the vicinity of the device, the proximity instructions may restore the device to a normal operating state and begin presentation of content, without the user having to touch the remote control, the media device, or utter a command. By providing devices which are responsive to the presence or absence of users, the overall user experience may be improved.

Illustrative System

FIG. 1 is an illustrative system 100 of operating a device based at least in part on user proximity data. A user 102 is depicted with a remote control 104. While a single user 102 is shown, in some implementations multiple users 102 may be present and may share the remote control 104. Similarly, in some implementations the system 100 may include more than one remote control 104. The remote control 104 may be a dedicated device, or a multipurpose device such as a tablet, smartphone, and so forth. The remote control 104 is discussed in more detail below with regard to FIG. 5.

The remote control 104 is configured to establish one or more communication paths 106 with one or more media devices 108(1), 108(2), ..., 108(D). These communication paths 106 may utilize communication interfaces and corresponding hardware to exchange information using radio frequency signals, magnetic fields, light, electrical signals, and so forth. For example, the communication paths 106 may utilize radio frequency signals which are compliant with at least a portion of the 802.15.1 standard (Bluetooth®), the 802.11 standard (Wi-Fi™), and so forth as promulgated by the Institute of Electrical and Electronics Engineers ("IEEE"). The communication paths 106 may utilize communication interfaces such as high definition multimedia interface ("HDMI"), ZigBee®, Ethernet, and so forth. The communication interfaces are discussed in more detail below.

The communication paths 106 allow the remote control 104, the media devices 108, and other devices to exchange information with one another. This information may include commands to control the media devices 108, content 110, and so forth. The content 110 may include audio, video, electronic books ("eBooks"), applications, games, and so forth.

The media devices 108 may include televisions, set top boxes, gaming consoles, cable television interfaces, audio/video receivers, tablet computers, smartphones, optical disk readers, refrigerators, microwave ovens, ovens, dishwashers, and so forth. The optical disk readers may include devices compatible with compact disks ("CDs"), digital versatile disks ("DVDs"), Blu-ray disks, and so forth. The optical disk readers in some implementations may be configured to write data as well as read.

In this illustration, media device 108(1) is a display device such as a television and the media device 108(2) is a set top box. The set top box media device 108(2) may provide various functions such as controlling the other media devices 108, presenting content, presenting a user interface to the user 102, and so forth. The media device 108 is discussed in more detail below with regard to FIG. 6.

The remote control 104, the media devices 108, and other devices in the system 100 may be configured to connect to one or more networks 112. The one or more networks 112 may include one or more personal area networks, local area networks, public networks such as the Internet, private networks, cellular data networks, or a combination thereof. The network 112 may in turn couple to one or more servers 114. The server 114 may exchange information with the remote control 104, the one or more media devices 108, or other servers. In some implementations the server 114 may be configured to provide at least a portion of the content 110 to the remote control 104, the media devices 108, or other devices. For example, the server 114 may be configured to stream the content 110 to the media device 108(2) by sending a series of pieces of the content 110. The server 114 may also be configured to transfer information between the remote control 104 and the media devices 108. The server 114 is discussed in more detail below with regard to FIG. 7.

While the server 114 is depicted as a single server, in some implementations the server 114 or the functions attributed to the server 114 may be provided by a plurality of devices. For example, the server 114 may be implemented as a virtualized server executing across a plurality of physical servers. Likewise, other servers may be similarly configured.

Other devices 116 may also be configured to connect to the network 112. These other devices 116 may include routers, content caching devices, bandwidth shapers, and so forth. As described below, in some implementations the operation of these other devices 116 may be affected based on the proximity of the one or more users 102 to the remote control 104, the media devices 108, and so forth.

The remote control 104 includes one or more communication interfaces 118. The communication interfaces 118 may be configurable to establish one or more connections between systems or devices. In one implementation, the communication interface 118 may support a connection compliant with at least a portion of the 802.15.1 standard (such as Bluetooth®), the 802.11 standard (such as Wi-Fi™), and so forth. These standards are promulgated by the Institute of Electrical and Electronics Engineers ("IEEE"). The communication interfaces 118 are discussed in more detail below with regard to FIG. 4.

The remote control 104 includes a communication module 120. The communication module 120 is configured to maintain one or more of the communication paths 106 with other devices. The communication module 120 may also be configured to facilitate the transfer of data along the communication paths 106. For example, where the communication interface 116 comprises Wi-Fi™, the communication module 120 may establish a communication path 106 between the remote control 104 and the media devices 108 which support Wi-Fi™, such as the set top box 108(2).

The remote control 104 may include one or more sensors 122. The sensors 122 are configured to acquire information which is indicative of the presence or absence of one or more of the users 102. The sensors 122 may include cameras, optical proximity sensors, and so forth. The sensors 122 are discussed in more detail below with regard to FIG. 5.

The information acquired from the sensors 122 may be used to generate user proximity data 124. The user proximity data 124 is indicative of the presence or absence of one or more of users 102 relative to the remote control 104 or another device. Proximity is descriptive of physical nearness and may be expressed as "present" or "absent", specify a number or quantity of users 102 proximate to the one or more sensors 122, specify a distance or position in space, and so forth. "Present" or "absent" may be determined based on one or more of location within the room, distance to the sensors 122, detection by the sensors 122, and so forth. For example, the user 102 may be present when within a field of view of a camera. In another example, the user 102 may be deemed "present" when within a pre-determined distance of the one or more sensors 122. In some implementations, the criteria for whether the user 102 is deemed "present" or "absent" may be defined by the user 102. For example, the user 102 with the media device 108 in a studio apartment may set "present" to be when the user 102 or another person is within 3 meters of the media device 108. A boundary between "present" or "absent" may also be defined in space, such as a particular area of the room. The user proximity data 124 is discussed in more detail below with regard to FIG. 2.

As described above, the remote control 104 may send at least a portion of the user proximity data 124 to one or more of the media devices 108, the server 114, and so forth. Based at least in part on the user proximity data 124 one or more of the remote control 104, the media device 108, or the server 114 may take various actions.

The media device 108 may include one or more communication interfaces 118, a communication module 120, one or more sensors 122, and be configured to generate or accept user proximity data 124. The media device 108 may also include a presentation module 126.

The presentation module 126 configures the media device 108 to present the content 110 or other information such as a user interface. In some implementations, the media device

108 is configured to act as a source and send content 110 or information based at least in part on the content 110, to one or more of the media devices 108 for presentation. For example, the set top box media device 108(2) may use the television media device 108(1) to present at least a portion of a graphic user interface used to control the set top box media device 108(2).

A proximity instruction module 128 may be present in the media device 108 and is configured to use proximity action data 130 to initiate one or more actions based on the user proximity data 124. These actions may include transitioning the device from one operating state to another, modifying presentation of the content 110, and so forth. The proximity instruction module 128 may be configured to receive proximity instructions from another device, such as the server 114, and execute those instructions.

The proximity action data 130 provides a correspondence between one or more predefined user proximity states and one or more proximity instructions which may be executed to perform actions. The user proximity data 124 may be compared with the user proximity state in the proximity action data 130 to select the one or more proximity instructions corresponding to the presence of absence of users 102. For example, the proximity action data 130 may define a user proximity state of the user 102(1) "Alice" being present as corresponding to a proximity instruction which, when executed, performs the action of initiating a video chat with recipient user 102(2) "Bob". The proximity instruction module 128 accepts the user proximity data 124, and determines if one of the user proximity states in the proximity action data 130 corresponds, and if so, initiates the action. Continuing the example, the user proximity data 124 indicating that user 102(1) "Alice" is present matches the previously defined user proximity state of "user 102(1) present". The user proximity state, in turn, corresponds to the proximity instructions to "initiate video chat with user 102(2)". The proximity action data 130 is discussed in more detail below with regard to FIG. 3.

The proximity instruction module 128 may be configured to work in conjunction with the presentation module 126. For example, determination that the user 102 has left the vicinity of the device may result in the action of generating a bookmark indicative of the time or portion in the content 110 at which the user 102 left the proximity.

The server 114 may also include one or more communication interfaces 118 and a communication module 120 to enable communication with the remote control 104, the media devices 108, other servers, and so forth. The server 114 may be configured to receive user proximity data 124 from the devices, and process this data using a proximity instruction module 128 and proximity action data 130. For example, based on the absence of the user 102 as indicated by the user proximity data 124 from the remote control 104, the proximity action data 130 may send one or more proximity instructions to the media device 108(2) to enter a low power state.

A content distribution module 132 is configured to provide the content 110, or portions thereof, to another device such as the remote control 104, the media device 108, and so forth. The content 110 provided may be presented, stored, and so forth. The content distribution module 132 may be configured to support one or more digital rights management ("DRM") schemes.

The server 114 may be configured to store one or more pieces of content 110, or portions thereof, and distribute the content 110 using the content distribution module 132. The proximity instruction module 128 may work in conjunction with the content distribution module 132. For example, the proximity action data 130 for the user proximity state that "no users 102 are present at the media device 108" may result in proximity instructions which, when executed, suspend or stop transmission by the content distribution module 132 of content 110 to the media device 108(2).

By using the user proximity data 124, operation of the remote control 104, the media devices 108, and the server 114 may be modified to take different actions based on whether the user 102 is present. In some implementations, the action may be specific to a particular user who is identified, or are specific to an unidentified user. This allows the system to be responsive in a less intrusive fashion than previously available. Furthermore, usage of resources such as electrical power, network bandwidth, and so forth may be reduced. For example, the user 102 may leave the room with the media device 108, and streaming of the content 110 may be discontinued, reducing network bandwidth consumed. Upon the user's 102 return, the actions may resume presentation at the point where the content 110 was discontinued.

FIG. 2 is a block diagram 200 of the user proximity data 124. As described above, the user proximity data 124 is indicative of the presence or absence of one or more users 102 at a physical location proximate to one or more devices, such as the remote control 104 or the media device 108. Data from the one or more sensors 122 is used to generate the user proximity data 124.

The user proximity data 124 may include data identifiers 202 ("data ID") which indicates a particular portion of the user proximity data 124. The device identification 204 ("device ID") indicates a particular device such as the remote control 104, the media device 108, and so forth from which the particular portion of the data has been obtained. The user proximity data 124 may also include information about sensors available 206. These may be the one or more sensors 122 which are available or active on the particular device, such as the remote control 104, the media device 108, or a combination of these. Output 208 includes the data resulting from the one or more sensors 122 on the particular device. The last updated data 210 indicates how long it has been since the last update of the output 208. In other implementations this may be expressed as time remaining until a next update is scheduled.

The determination as to whether the user 102 is "present" or "absent" may be based on the output 208. This output 208 may be analyzed to determine a correspondence with one or more of the user proximity states stored in the proximity action data 130 described below in FIG. 3. The determination may be strictly defined as in one state or in another, such as the user 102 is in front of the sensor 122 or is not. However, the determination of proximity may also be indicative of location of the user 102, distance to the user, relative motion, and so forth. For example, the user proximity data 124 may indicate that the user 102 is walking away from the media device 108. As a result, the output 208 may be associated with user proximity states corresponding to proximity instructions which, when executed, discontinue presentation of video content by the media device 108, regardless of the distance between the sensor 122 and the user 102.

In the examples illustrated here, the data 202(1) is from the media device 108(1), which has a Wi-Fi™ communication interface 118 which provides data used to detect another device, such as a smartphone of the user 102. The output 208 indicates that the user device has been detected, and the last updated 210 information indicates the output 208 data is 60 seconds old.

Depending upon the capabilities of the device, the user proximity data 124 may provide different degrees of detail. For example, the data ID 202(2) for information from the set top box media device 108(2) includes output 208 from infrared proximity sensors 122 which indicate a moving object was detected at 3 meters. In some implementations, the sensors 122 may not be able to distinguish between objects such as a human child, an adult human, a large pet, a curtain blowing in the wind, and so forth. The moving object may be assumed to be the user 102 in one implementation, while in another implementation output 208 from multiple sensors 122 may be combined to allow for distinction between objects, individual users 102, and so forth.

The user proximity data 124 may provide information about relative positions of the one or more users 102 in the environment. For example, three users 102(1)-(3) are sitting next to one another. Or two users 102(1)-(2) are standing next to one another while a third user 102(3) is sitting across the room. Additionally, orientation of the user 102 may also be determined. For example, the user proximity data 124 may include information about whether the user 102 is facing towards or away from the sensor 122.

Information such as posture or positioning may also be obtained. For example, a range camera may provide information about whether the user 102 is sitting or standing.

In some implementations, an identity of the user 102 may be provided in the user proximity data 124. The identity of the user 102 may be relative or absolute. Relative identity is a distinction between different users 102, such that user 102(1) and user 102(2) are different people. The relative identity as user 102(1) and user 102(2) may be used to configure different bookmarks in the content 110 based on who has entered or left the proximity of the remote control 104 or the media device 108. The absolute identity specifies that a particular individual, such as user 102(1) is "Alice Q. Jones" while user 102(2) is "Bob A. Smith". Depending upon the techniques used to determine identity, accuracy may vary. For example, the relative and absolute identity may be determined based on facial recognition, with a first level of accuracy. Higher levels of accuracy may be accomplished by using different techniques, such as facial recognition, entry of a secret (such as a password), and receipt of data from a token such as an NFC or RFID tag.

While the user proximity data 124 and other data such as the proximity action data 130 are depicted as tables, in other implementations other data structures may be used to store the information. For example, the user proximity data 124 may be stored as one or more of program code, executable binary, a table, array, linked list, and so forth.

FIG. 3 is a block diagram 300 of the proximity action data 130. As described above, the proximity action data 130 provides a correspondence between one or more user proximity states and one or more proximity instructions. The proximity instruction module 128 may use this correspondence to determine proximity instructions. Once determined, the proximity instruction module 128 may initiate the actions described by those proximity instructions, send the proximity instructions to another device, and so forth.

An action identifier 302 ("action ID") indicates different associations between one or more user proximity states 304 and one or more proximity instructions 306. The action ID 302 may be omitted in some implementations. The user proximity states 304 are predefined and describe a particular scenario with respect to the presence or absence of one or more users in proximity to one or more of the media device 108, the remote control 104, or the sensor 122. For example, the user proximity state 304 for action ID 302(3) may specify "proximate user no longer detected for at least 20 minutes", which describes the situation where no user 102 has been detected as being proximate to the one or more sensors 122 for at least 20 minutes.

The proximity instructions 306 are configured to, upon execution by one or more processors, perform one or more actions. These actions may be on one or more devices, including the remote control 104, the media device 108, the server 114, and so forth. For example, the action ID 302(1) associates the user proximity state 304 of "proximate user detected" with the proximity instruction 306 to "stream audio and video content".

The proximity instructions 306 may be directed to one or more devices. For example, the action 302(5) for user proximity state 304 of "no proximate user detected" is associated with proximity instructions 306 to discontinue streaming of the content 110 at the server 114 and to send commands to transition the media device 108 from the normal operating state to a lower power state.

The particular proximity instructions 306 may be associated with groups of devices such as particular makes and models of the media devices 108, or may be associated with a particular device.

In some implementations, the proximity instructions 306 may be associated with a particular user 102 and configured to allow for the action to "follow" the user 102. This allows the particular proximity instruction 306 to be implemented across different devices that the user 102 may use to access content 110. For example, the user proximity state 304 of the user 102(1) "Alice" being detected may be associated with proximity instructions 306 to initiate a video chat with recipient user 102(2) "Bob". Regardless of whether the user 102 is proximate to the television media device 108(1) or a handheld media device 108(3), once the user proximity data 124 is determined to indicate the presence of the user 102(1) "Alice", a video chat session is initiated automatically with the user 102(2) "Bob".

The proximity instructions 306 may also be associated with particular postures or groupings of users 102, as indicated in the user proximity state 304. For example, the action ID 302(11) associates user proximity state 304 indicative of a first user 102(1) present and seated while a second user 102(2) is detected standing with the proximity instruction 306 to initiate presentation of captioning. In the situation where one user 102(1) is sitting and watching television, the second user 102(2) entering the room and standing there may be distracting to the first user 102(2), and may be talking or otherwise noisy. Likewise, when the second user 102(2) leaves the room, the proximity instruction 306 may discontinue presentation of the captioning. By automatically presenting and discontinuing the captioning, the first user's 102 experience consuming the content 110 may be improved.

Other action IDs 302(A) provide for other user proximity states 304 corresponding to other proximity instructions 306. User proximity state 304 associated with presence of an identified user 102 or a particular type of user 102 may correspond with proximity instructions 306 to present a certain user interface. For example, the user proximity data 124 may distinguish a child user 102 from an adult user 102. A corresponding user proximity state 304 of "child user detected" may have a corresponding proximity instruction 306 to present a simplified user interface configured for use by the child.

The proximity instructions 306 may be configured to interact with various modules, such as the presentation module 126, the content distribution module 132, and so forth. For example, the action ID 302(10) illustrates generating bookmarks associated with content being presented at a time an additional user 102 is detected. Likewise, a bookmark may be generated at a time when the user 102 leaves the vicinity. Continuing the example, presentation of the content may be suspended upon the user 102 leaving the vicinity and resume upon arrival of the user 102.

Bookmarks may be associated with specific users 102, specific content 110, or both. The proximity instructions 306 may be configured to support divergent and convergent content 110 consumption experiences. For example, the user 102(1) "Alice" and the user 102(2) "Bob" may sit down to start watching content 110(1) comprising a movie and presented at least in part on the television media device 108(1). At time 0:35 (hours:minutes) into presentation, the user 102(1) "Alice" has to leave. As a result, the content consumption of these users 102 has diverged. A bookmark is generated associating the user 102(1) "Alice" with the content 110(1) and the time 0:35. The user 102(2) "Bob" continues to watch for a while, and finally stops at time 1:10. The next day, the user 102(1) "Alice" resumes consumption of the content at time 0:35. Before the user 102(1) "Alice" reaches time 1:10 (the time of the bookmark for the user 102(2) "Bob"), a prompt may be presented. The prompt may ask the user 102(1) "Alice" if she would like to wait for the user 102(2) "Bob" to join and watch the rest of the movie. Should the user 102(2) "Bob" join the user 102(1) "Alice", their respective bookmarks may be removed. This results in their consumption experiences converging. Should the user 102(1) "Alice" continue watching without the user 102(2) "Bob", the bookmark for the user 102(2) "Bob" at 1:10 would remain.

Bookmarks, as used in this disclosure, comprise data which is indicative of a particular location or portion of the content 110. The particular location or portion of the content 110 may be expressed in terms of time, frame, bytes, chapter, and so forth. In some implementations, the bookmark may be expressed using a markup language, such as hypertext markup language ("HTML"), extensible markup language ("XML"). For example, the bookmark may comprise data indicating the identity of the user 102(1), a content identifier indicating the particular piece of content 110, and a time within the content 110.

The proximity action data 130 may be stored as one or more of program code, executable binary, a table, array, linked list, and so forth. For example, the correspondence between user proximity states 304 and the proximity instructions 306 may be made using pointers, position within a matrix or table, conditional logic, and so forth.

Figure 4:
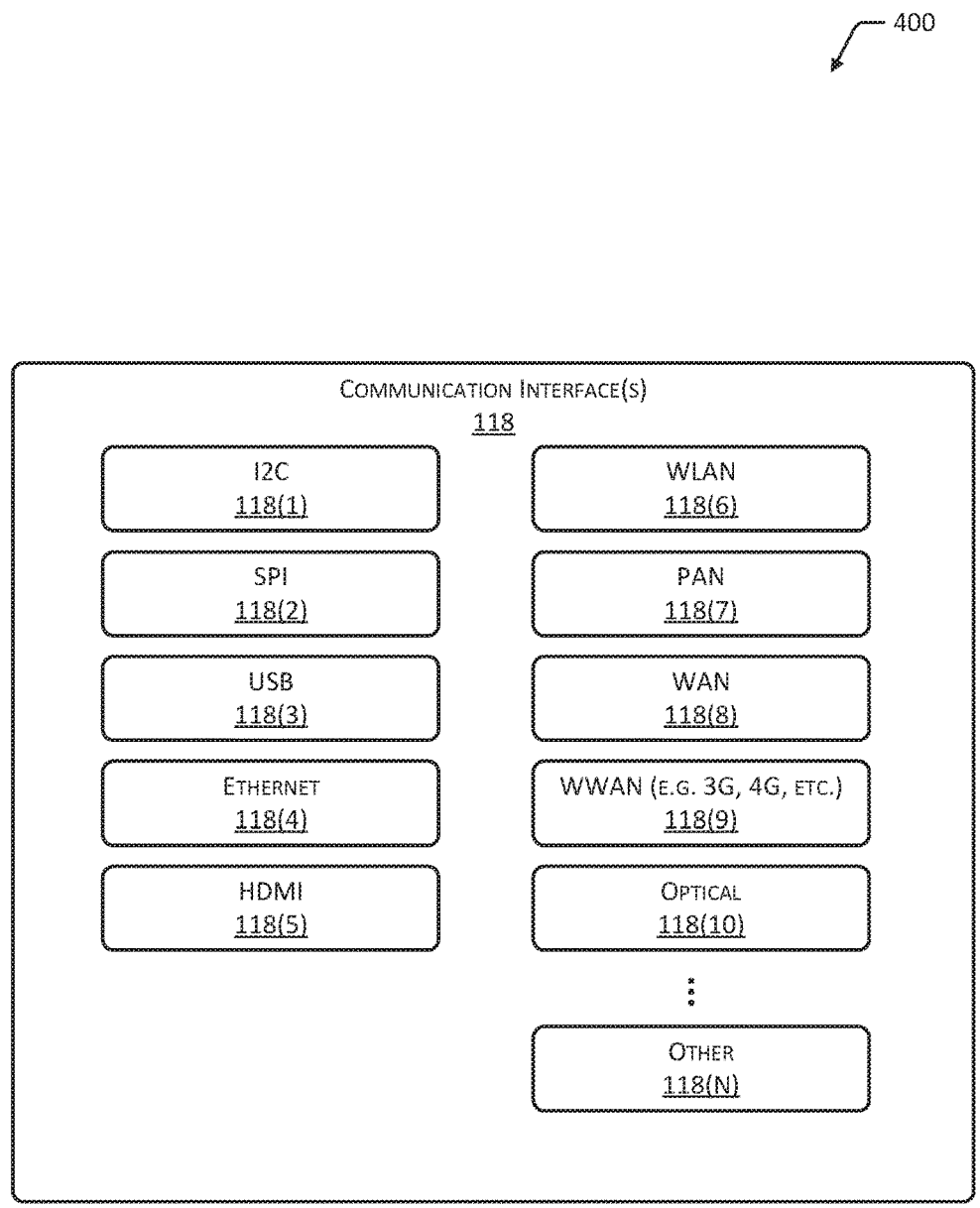
FIG. 4 is a block diagram of communication interfaces that may be used on the various devices in the system.

FIG. 4 depicts block diagrams 400 of the communication interfaces 118 which may be available in the remote control 104, the media device 108, the server 114, and so forth. The communication interfaces 118 may be used to communicate with internal components, external devices, or both.

The communication interfaces 118 may include one or more of an inter-integrated circuit ("I2C") interface 118(1), serial peripheral interface bus 118(2) ("SPI"), or Universal Serial Bus 118(3) ("USB"). Ethernet 118(4) compliant with the IEEE 802.3 standard promulgated by the Institute of Electrical and Electronics Engineers ("IEEE") may be provided. A high definition multimedia interface ("HDMI") 118(5) may be provided. The HDMI interface 118(5) may be configured to support control data sequences which are compliant with at least a portion of the Consumer Electronics Control ("CEC") standard, Ethernet over HDMI, and so forth.

A wireless local area network ("WLAN") interface 118(6) may be provided. In one implementation, the WLAN interface 118(6) may be configurable to support connections compliant with at least a portion of the IEEE 802.11 specification, such as to Wi-Fi™ devices. A personal area network ("PAN") 118(7) may also be provided. In one implementation, the PAN interface 118(7) may be configurable to support connections compliant with at least a portion of the IEEE 802.15.1 specification, such as to Bluetooth® devices. In another implementation, the PAN interface 118(7) may be configurable to support connections compliant with at least a portion of the IEEE 802.4 specification such as to ZigBee® devices. Multiple WLANs 118(6), PANs 118(7), or other connections may be supported simultaneously by the device. For example, Bluetooth® and ZigBee® connections may be available at the same time.

Wide area network ("WAN") interfaces 118(8) may also be provided. The WAN interfaces 118(8) may be configurable to support connections compliant with the data over cable service interface specification ("DOCSIS"), digital subscriber lines, and so forth.

The communication interfaces 118 may also include wireless wide area network ("WWAN") interfaces 118(9) configurable to couple to cellular, satellite, or other carriers. For example, the WWAN interfaces 118(9) may allow for coupling to 3G networks, Long-Term Evolution ("LTE") or 4G networks, and so forth.

An optical interface 118(10) comprising an optical transmitter, an optical receiver, or both may be provided. The optical interface 118(10) may use free-space transmission, optical fibers, waveguides, or a combination thereof. For example, the optical interface 118(10) may implement TOSLINK® as promulgated by Toshiba Corp. The optical interface 118(10) may use visible light, infrared light, or ultraviolet light to transmit or receive information. For example, the optical interface 118(10) may be configured to generate infrared signals configured to control one or more of the media devices 108.

Other interfaces 118(N) may also be provided, such as acoustic, analog video, analog audio, IEEE 1394, and so forth. For example, an acoustic interface may be configured to receive or transmit information using ultrasonic sounds.

The communication interfaces 118 may be configured to provide information which may be indicative of proximity of the user 102 to portions of the communication interfaces 118, such as an antenna. For example, the WLAN 118(6) interface may be configured to provide information such as an identifier used in a Wi-Fi Direct® communication between the communication interface 118 and a corresponding communication interface 118 on another device, such as the user's 102 smartphone or portable media device. Other information such as signal strength may also be provided. User proximity data 124 may be generated based on this data. For example, the WLAN interface 118(6) in the set top box media device 108(2) may detect a broadcast identifier of "AlicesPhone" from the user 102(1)'s smartphone. Signal strength of this broadcast being above a threshold value may be indicative of the presence of that smartphone in the same room as the media device 108(2). Presence of the smartphone may thus be used as a proxy for presence of the user 102(1) associated with that smartphone.

In another implementation, a detected drop in signal strength received at one or more of the communication interfaces 118 may be indicative of the user's 102 proximity. For example, the PAN interface 118(7) of the media device 108(2) may transmit a signal which is detected by the remote control 104. The user 102 moving between the two devices may attenuate the signal, decreasing the received signal strength. This decrease may be determined to be indicative of proximity of the user 102.

Different devices may have different communications interfaces 118 installed or otherwise available. For example, the media device 108 may have an HDMI interface 118(5) while the server 114 may not.

Figure 5:
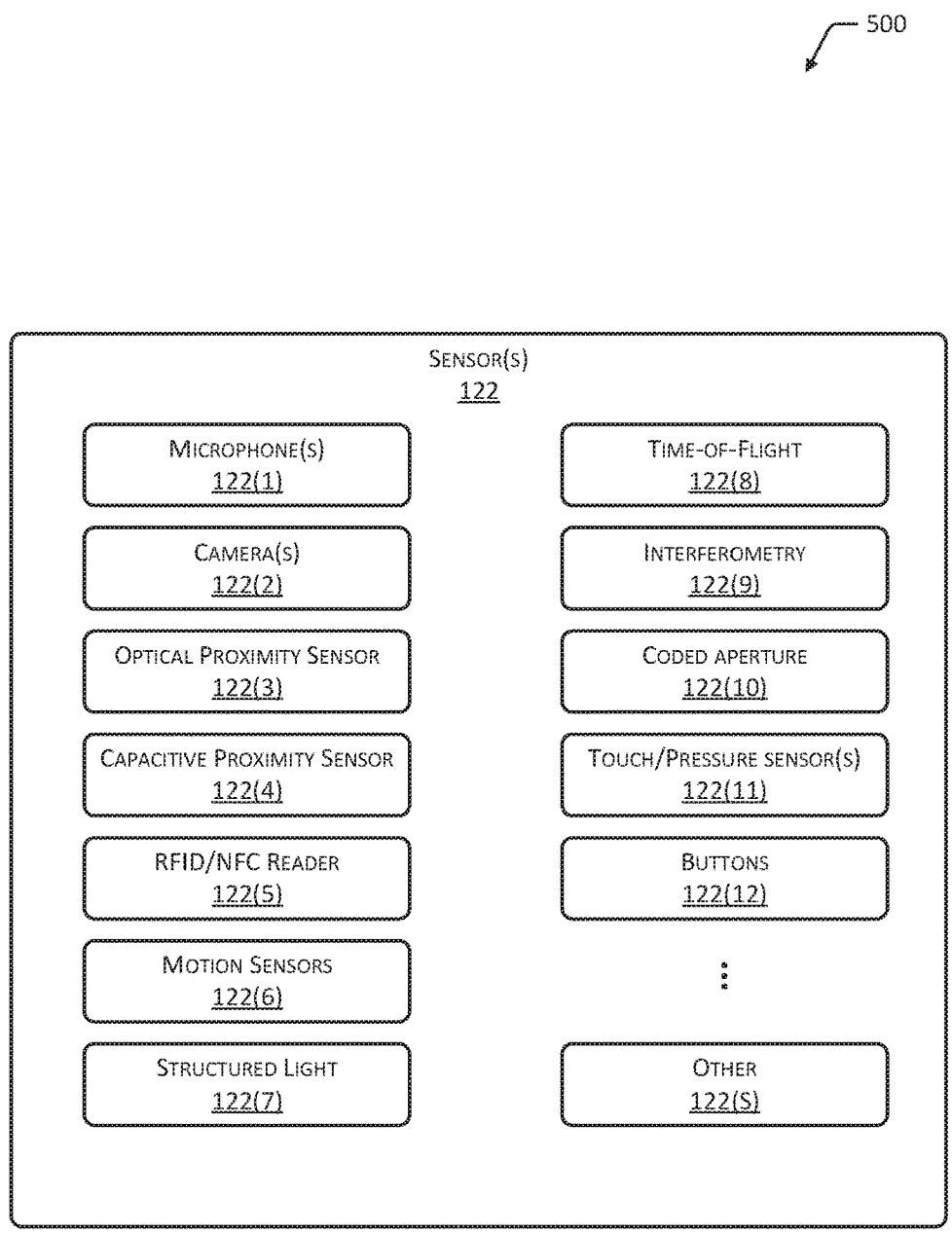
FIG. 5 is a block diagram of sensors that may be used on the various devices in the system.

FIG. 5 is a block diagram 500 of the one or more sensors 122 that may be used on the various devices in the system. The sensors 122 are configured to acquire information which may be indicative of user proximity, position, placement, orientation, posture, identity, and so forth. This information may be used to generate the user proximity data 124.

The sensors 122 may include one or more microphones 122(1). The microphones 122(1) may be configured to detect human speech, sounds of movement, and so forth. In some implementations, a plurality of microphones 122(1) may be configured to localize a source of sound and determine position within a one-, two-, or three-dimensional space.

One or more cameras 122(2) may be provided to generate images using one or more of infrared light, visible light, ultraviolet light, and so forth. The cameras 122(2) may include charge coupled devices ("CCD"), complementary metal oxide semiconductor ("CMOS") devices, and so forth. In some implementations, the cameras 122(2) may be used in conjunction with other systems such as the structured light or time-of-flight systems described below. The one or more cameras 122(2) may be configured to provide mono- or stereovision.

An optical proximity sensor 122(3) is configured to use light to determine the presence or movement of an object. The optical proximity sensors 122(3) may be configured to generate one or more pulses of light, and use a detector such as a photodetector, photodiode, camera, and so forth to detect reflections of the one or more pulses from objects. In some implementations time-of-flight, intensity, or other characteristics may be measured to determine a distance between the sensor 122(3) and the object.

A capacitive proximity sensor 122(4) may be configured to determine presence of an object based on changes in electrical capacitance. For example, the presence of the user 102 near the capacitive proximity sensor 122(4) may result in capacitive coupling which changes the capacitance of an electrical surface.

A radio frequency identification ("RFID") or near field communication ("NFC") reader 122(5) are configured to generate a radio frequency interrogation signal which provides power to a tag. The tag, responsive to the signal, emits a radio frequency signal which may be received. The signal emitted by the tag may be used to indicate presence, or may encode information. For example, the user 102(1) may have an RFID tag affixed to or embedded with a piece of jewelry, glasses, watch, and so forth which contains a unique identification number. By interrogating the tag and receiving the signal, the proximity and identity of the user 102 may be determined. Distance may be inferred by varying the output power of the interrogation signal, such that lower output powers are associated with closer distances.

Motion sensors 122(6) such as accelerometers, tilt meters, gyroscopes, and so forth provide information about movement of an object. For example, the remote control 104 may incorporate one or more motion sensors 122(6). Movement information from the motion sensors 122(6) may be indicative of the user 102 being present at a particular vicinity.

A structured light system 122(7) uses a known pattern projected onto objects to determine information such as surface contour, distance, size, and so forth. In some implementations this pattern may be generated by a projector. The pattern may be projected in visible light, infrared light, or other wavelengths. With structured light, the camera 122(2) acquires an image which includes at least a portion of the projected pattern. Based at least in part on variations in the pattern due to interactions with the objects, information such as distance, surface contours, size, and other three-dimensional information may be calculated. For example, the structured light system 122(7) may be used to determine that the user's 102 finger is pointing at the media devices 108(5).

A time-of-flight ("TOF") system 122(8) uses propagation time to determine a distance to an object in the environment. The TOF 122(8) system may use propagation of signals such as sound, infrared light, visible light, terahertz waves, radio waves, and so forth. For example, an infrared laser may be directed to scan a volume, emitting pulses of infrared light. During the scan, the pulses may be reflected at least in part from some of the objects in the volume. A detector, such as one of the cameras 122(2) or a photodetector, detects the reflected pulses. A timing mechanism is configured to determine a time-of-flight of the emitted signal. Based on the time-of-flight, a distance to the portion of the object from which the pulse was reflected can be determined. Time-of-flight in the optical domain may be known as LIDAR, in the radio frequency domain as RADAR, and in the audio domain as SONAR. The TOF system 122(8) may be configured to acquire depth information the image frames acquired by the one or more cameras 122(2).

An interferometry system 122(9) is configured to determine three-dimensional information about objects in space by illuminating one or more points on objects with coherent light. A phase shift, relative to the emitted light, of the reflected light is measured and used to determine a distance to the point on the object.

A coded aperture system 122(10) uses propagation characteristics of light from a scene through a specially coded aperture pattern or grating having holes of various sizes. Given the known coded aperture pattern, information about distance to a point in the image may be determined.

Touch/pressure sensors 122(11) may include capacitive touch sensors, resistive touch sensors, optical touch sensors, acoustic touch sensors, load cells, strain gauges, and so forth. The touch/pressure sensors 122(11) may be configured to provide information about incident pressure, presence of the incident pressure, location, magnitude, and so forth.

Buttons 122(12) allow the user 102 to physically manipulate at least a portion of the device to generate an input signal. Buttons may include mechanical contact switches, optical switches, and so forth.

Proximity of the user 102 to the device with the touch/pressure sensors 122(11), buttons 122(12), or both may be determined based on activation of the buttons. For example, the user 102 touching the volume control on the remote control 104 may be deemed to be proximate to the remote control 104.

Other sensors 122(S) may also be provided. For example, an ambient light sensor may be configured to provide an indication of a level of illumination.

These sensors 122 may be coupled to one or more processors using one or more of the communication interfaces 118 described above. For example, the motion sensors 122(6) may connect to one or more processors using the SPI interface 118(2).

Different devices may have different sensors 122 installed or otherwise available. For example, the remote control 104 may have the motion sensors 122(6) while the media device 108 may not.

Figure 6:
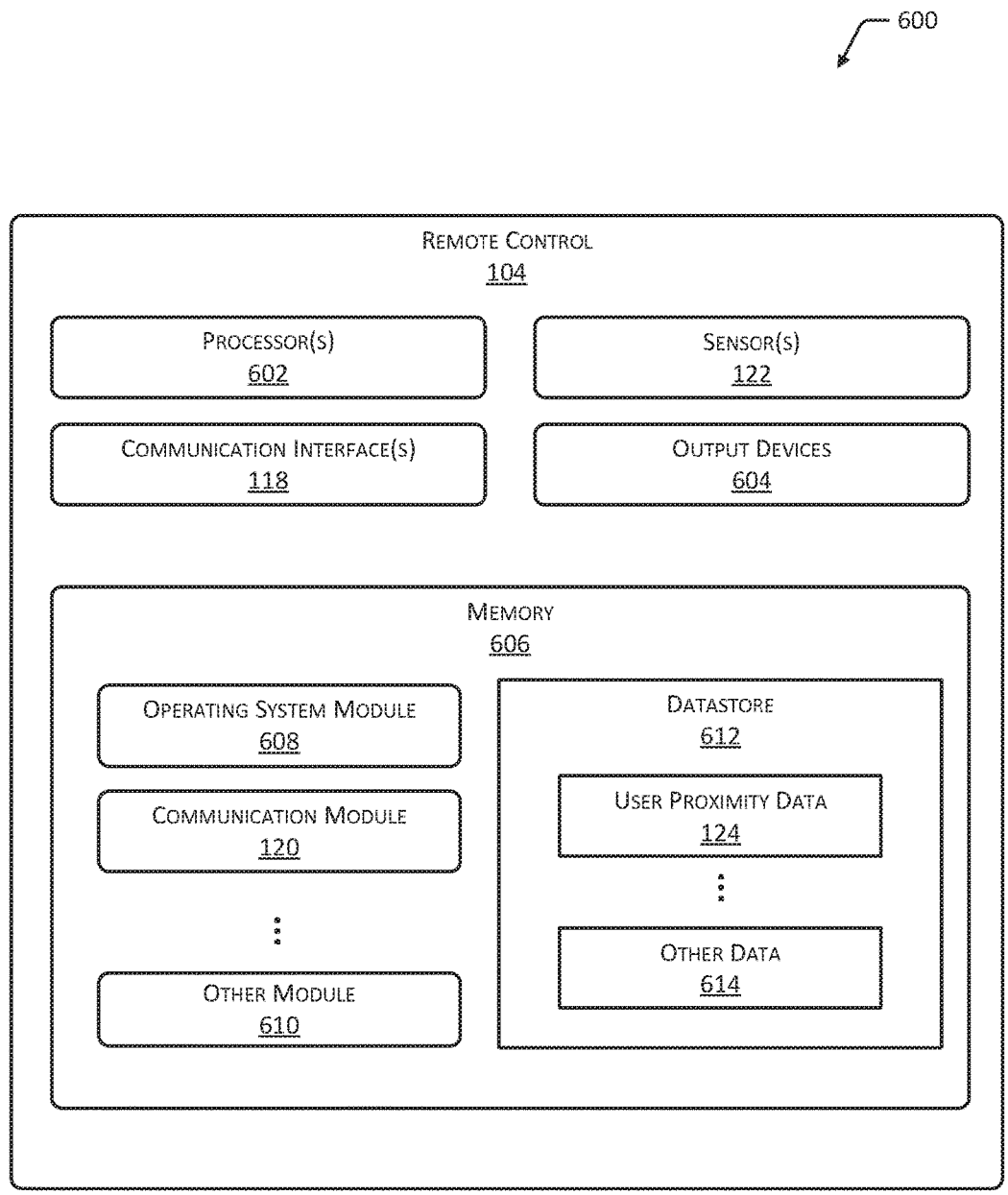
FIG. 6 is a block diagram of a remote control configured to provide user proximity data and respond to one or more proximity instructions.

FIG. 6 is a block diagram 600 of the remote control 104 configured to provide user proximity data 124. The remote control 104 may also be configured to respond to one or more proximity instructions 306 as provided by the server 114, the media device 104, or other devices.

The remote control 104 may include one or more processors 602 configured to execute one or more stored instructions. The processors 602 may comprise one or more cores. The remote control 104 may include one or more communication interfaces 118 to allow the processor 602 or other portions of the remote control 104 to communicate with other devices. As described above, the communication interfaces may include I2C, SPI, USB, and so forth. The communication interfaces 118 may be configured to couple to the network 112, the media device 108, other devices such as access points, and so forth.

The communication interfaces 118 may couple to one or more I/O devices. The I/O devices may include one or more of the sensors 122, as well as output devices such as displays, haptic output devices, and so forth. The displays may include liquid crystal displays, interferometric displays, electrophoretic displays, electrowetting displays, cholesteric displays, light emitting diode displays, and so forth. In some implementations the displays may also utilize image projection systems having liquid crystal displays, digital micromirror devices, MEMs spatial light modulators, liquid crystal on silicon displays, light emitting diodes, lasers, and so forth.

The I/O devices may be physically incorporated with the remote control 104 or may be externally placed. The remote control 104 may also include one or more busses or other internal communications hardware or software that allow for the transfer of data between the various modules and components of the remote control 104.

As shown in FIG. 6, the remote control 104 includes one or more memories 606. The memory 606 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 606 provides storage of computer readable instructions, data structures, program modules and other data for the operation of the remote control 104.

The memory 606 may include at least one operating system ("OS") module 608. The OS module 608 is configured to manage hardware resource devices such as the communication interfaces 118, the I/O devices, and provide various services to applications or modules executing on the processors 602. Also stored in the memory 606 may be one or more of the following modules. These modules may be executed as foreground applications, background tasks, daemons, and so forth.

The communication module 120, as described above is configured to maintain one or more of the communication paths 106 with other devices. The communication module 120 may be configured to send, receive, or send and receive data between the devices.

Other modules 610 may also be present. For example, a presentation module 126 may be provided to allow the remote control 104 to act as a source and send content 110 to one or more of the media devices 108 for presentation. In some implementations the remote control 104 may also include the proximity instruction module 128.

The memory 606 may also include a datastore 612 to store information. The datastore 612 may use a flat file, database, linked list, tree, or other data structure to store the information. In some implementations, the datastore 612 or a portion of the datastore 612 may be distributed across one or more other devices including servers 114, network attached storage devices, and so forth.

The datastore 612 may also store the user proximity data 124, or other data 614. For example, the other data 614 may include communication path parameters, control data, and so forth. In some implementations, the datastore 612 may store a portion of the content 110, or the entire piece of content 110.

Figure 7:
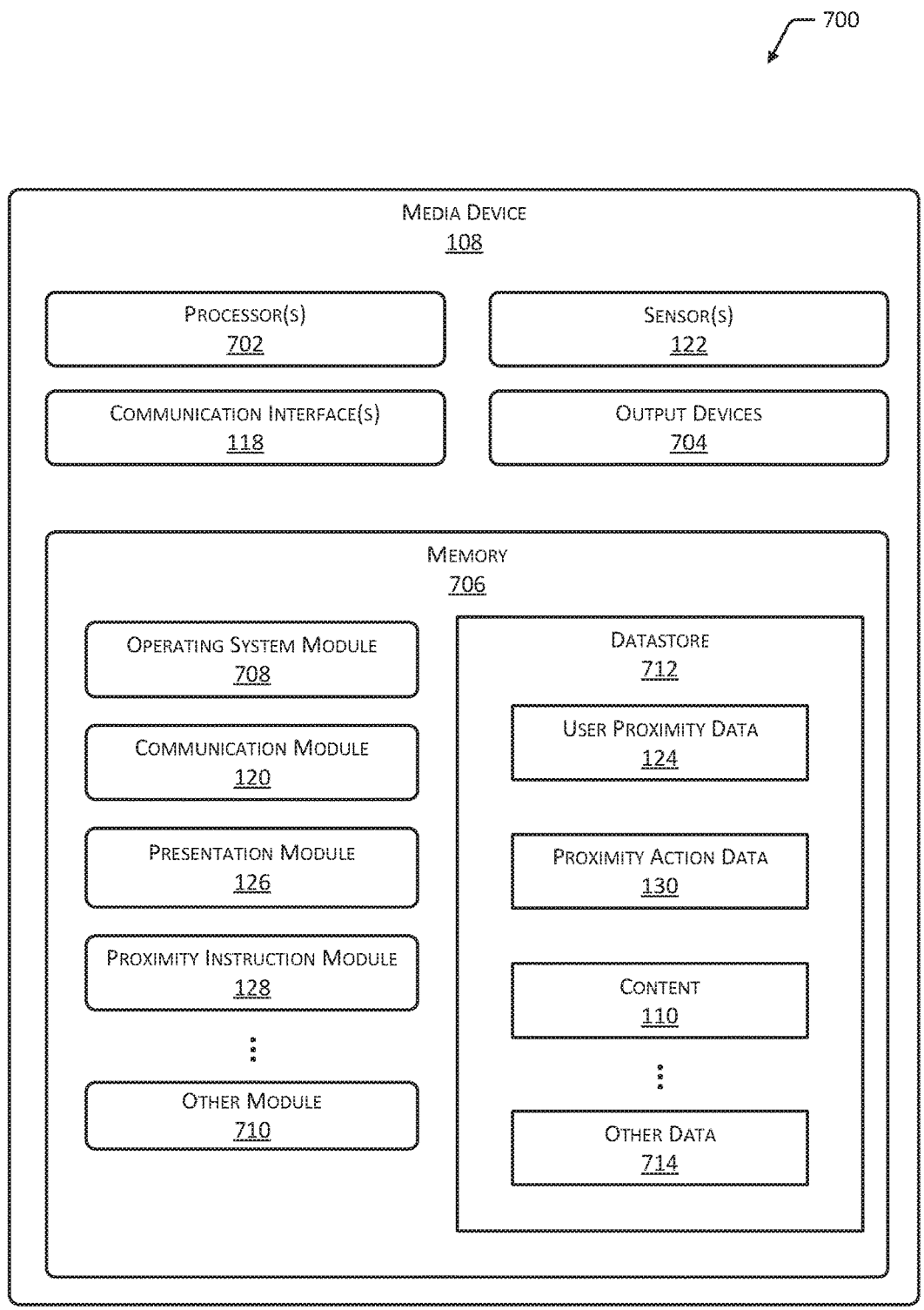
FIG. 7 is a block diagram of a media device configured to provide user proximity data and respond to one or more proximity instructions.

FIG. 7 is a block diagram 700 of the media device 108. The media device 108 may be configured to provide user proximity data 124, respond to one or more proximity instructions 306, or both.

The media device 108 may include one or more processors 702 configured to execute one or more stored instructions. The processors 702 may comprise one or more cores. The media device 108 may include one or more communication interfaces 118 to allow the processor 702 or other portions of the media device 108 to communicate with other devices. As described above, the communication interfaces may include I2C, SPI, USB, and so forth. The communication interfaces 118 may be configured to couple to the network 112, the media device 108, other devices such as access points, and so forth.

The communication interfaces 118 may couple to one or more I/O devices. The I/O devices may include one or more of the sensors 122, as well as output devices 704 such as displays, haptic output devices, and so forth. The displays may include liquid crystal displays, interferometric displays, electrophoretic displays, electrowetting displays, cholesteric displays, light emitting diode displays, and so forth. In some implementations the displays may also utilize image projection systems having liquid crystal displays, digital micromirror devices, MEMs spatial light modulators, liquid crystal on silicon displays, light emitting diodes, lasers, and so forth.

The I/O devices may be physically incorporated with the media device 108 or may be externally placed. The media device 108 may also include one or more busses or other internal communications hardware or software that allow for the transfer of data between the various modules and components of the media device 108.

As shown in FIG. 7, the media device 108 includes one or more memories 706. The memory 706 comprises one or more CRSM. The memory 706 provides storage of computer readable instructions, data structures, program modules and other data for the operation of the media device 108.

The memory 706 may include at least one OS module 708. The OS module 708 is configured to manage hardware resource devices such as the communication interfaces 118, the I/O devices, and provide various services to applications or modules executing on the processors 702. Also stored in the memory 706 may be one or more of the following modules. These modules may be executed as foreground applications, background tasks, daemons, and so forth.

The communication module 120, as described above is configured to maintain one or more of the communication paths 106 with other devices. The communication module 120 may be configured to send, receive, or send and receive data between the devices.

As described above, the presentation module 126 configures the media device 108 to present the content 110 or other information such as a user interface. In some implementations, the media device 108 is configured to act as a source and send content 110 or information based at least in part on the content 110, to one or more of the media devices 108 for presentation. For example, the set top box media device 108(2) may use an audio/video receiver ("AVR") media device 108(3) to present audible content 110.

The proximity instruction module 128 is configured to use the proximity action data 130 to take one or more actions based on the user proximity data 124. The proximity instruction module 128 determines a correspondence between at least a portion of the output 208 of the user proximity data 124 and the user proximity state 304. As described above, the user proximity state 304 corresponds to the proximity instructions 306. Once the proximity instructions 306 have been determined, they may be executed to perform one or more actions. These actions may include transitioning one or more of the devices from one operating state to another, modifying presentation of the content 110, and so forth.

The proximity instruction module 128 may be configured to receive proximity instructions 306 from another device, such as the server 114, and execute those instructions. For example, the proximity instruction module 128 of the media device 108 may be configured to receive the proximity instructions 306 from the server 114 and execute those instructions on the one or more processors 702.

Other modules 710 may also be present. For example, a digital rights management ("DRM") module may be provided to allow the media device 108 to present content which is protected by one or more DRM schemas.

The memory 706 may also include a datastore 712 to store information. The datastore 712 may use a flat file, database, linked list, tree, or other data structure to store the information. In some implementations, the datastore 712 or a portion of the datastore 712 may be distributed across one or more other devices including servers 114, network attached storage devices, and so forth.

The datastore 712 may also store the user proximity data 124, the proximity action data 130, the content 110 or a portion thereof, or other data 714. For example, the other data 714 may include communication path parameters, control data, user preferences, user interface elements, and so forth.

Figure 8:
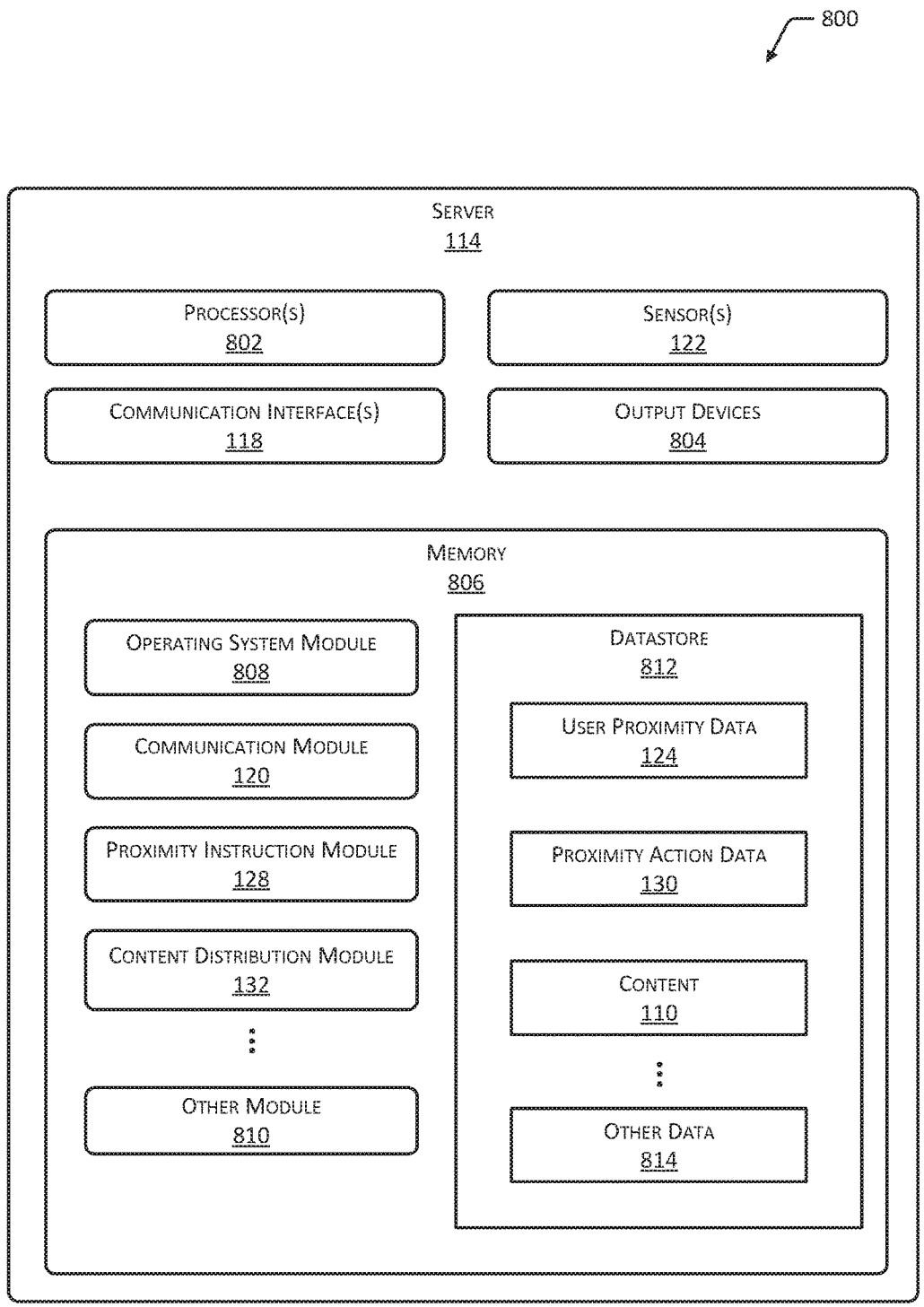
FIG. 8 is a block diagram of a server configured to receive user proximity data and execute one or more proximity instructions or send one or more proximity instructions to the remote control, the media device, or both.

FIG. 8 is a block diagram 800 of the server 114. The server 114 may be configured to receive the user proximity data 124 from one or more devices such as the remote control 104, the media devices 108, and so forth, and execute or distribute one or more proximity instructions to those devices.

The server 114 may include one or more processors 802 configured to execute one or more stored instructions. The processors 802 may comprise one or more cores. The server 114 may include one or more communication interfaces 118 to allow the processor 802 or other portions of the server 114 to communicate with other devices. As described above, the communication interfaces may include I2C, SPI, USB, and so forth. The communication interfaces 118 may be configured to couple to the network 112, the server 114, other devices such as access points, and so forth.

The communication interfaces 118 may couple to one or more I/O devices. The I/O devices may include one or more of the sensors 122, as well as output devices 804 such as displays, haptic output devices, and so forth. The I/O devices may be physically incorporated with the server 114 or may be externally placed. The server 114 may also include one or more busses or other internal communications hardware or software that allow for the transfer of data between the various modules and components of the server 114.

As shown in FIG. 8, the server 114 includes one or more memories 806. The memory 806 comprises one or more CRSM. The memory 806 provides storage of computer readable instructions, data structures, program modules and other data for the operation of the server 114.

The memory 806 may include at least one OS module 808. The OS module 808 is configured to manage hardware resource devices such as the communication interfaces 118, the I/O devices, and provide various services to applications or modules executing on the processors 802. Also stored in the memory 806 may be one or more of the following modules. These modules may be executed as foreground applications, background tasks, daemons, and so forth.

The communication module 120, as described above is configured to maintain one or more of the communication paths 106 with other devices. The communication module 120 may be configured to send, receive, or send and receive data between the devices.

The proximity instruction module 128 is configured to use the proximity action data 130 to take one or more actions based on the user proximity data 124 expressed as the proximity instructions 306. The proximity instruction module 128 may associate information in the user proximity data 124 with actions expressed as the proximity instructions 306. These actions may include modifying presentation of the content 110, initiating a video chat, and so forth, or otherwise executing the instructions on the one or more processors 802.

The proximity instruction module 128 may be configured to send proximity instructions 306 to devices, such as the remote control 104, the media devices 108, and so forth. These devices are configured to execute those instructions. For example, the proximity instruction module 128 of the server 114 may send the proximity instructions 306 configured to initiate a video chat to the media device 108. The proximity instruction module 128 of the media device 108 may receive this information and execute those instructions on the one or more processors 702.

The content distribution module 132 is configured to provide the content 110, or portions thereof, to devices such as the remote control 104, the media device 108, and so forth. The content distribution module 132 may be configured to support one or more digital rights management ("DRM") schemes. Operation of the content distribution module 132 may be based at least in part on the user proximity data 124 and the proximity instructions 306 provided by the proximity instruction module 128 accessing the proximity action data 130. For example, the user proximity data 124 may indicate the presence of the user 102(4) who is designated as a minor child and as such lacks access to content 110 having particular ratings.

Other modules 810 may also be present. For example, a speech recognition module may be configured to accept audio input from the microphones 122(1) of the one or more devices and generate command data to control operations of one or more of the server 114, the remote control 104, or the media device 104 using spoken commands.

The memory 806 may also include a datastore 812 to store information. The datastore 812 may use a flat file, database, linked list, tree, or other data structure to store the information. In some implementations, the datastore 812 or a portion of the datastore 812 may be distributed across one or more other devices including servers 114, network attached storage devices, and so forth.

The datastore 812 may also store the user proximity data 124, the proximity action data 130, the content 110 or a portion thereof, or other data 814. For example, the other data 814 may include user account information, DRM keys, communication path parameters, control data, user preferences, and so forth.

Illustrative Processes

Figure 9:
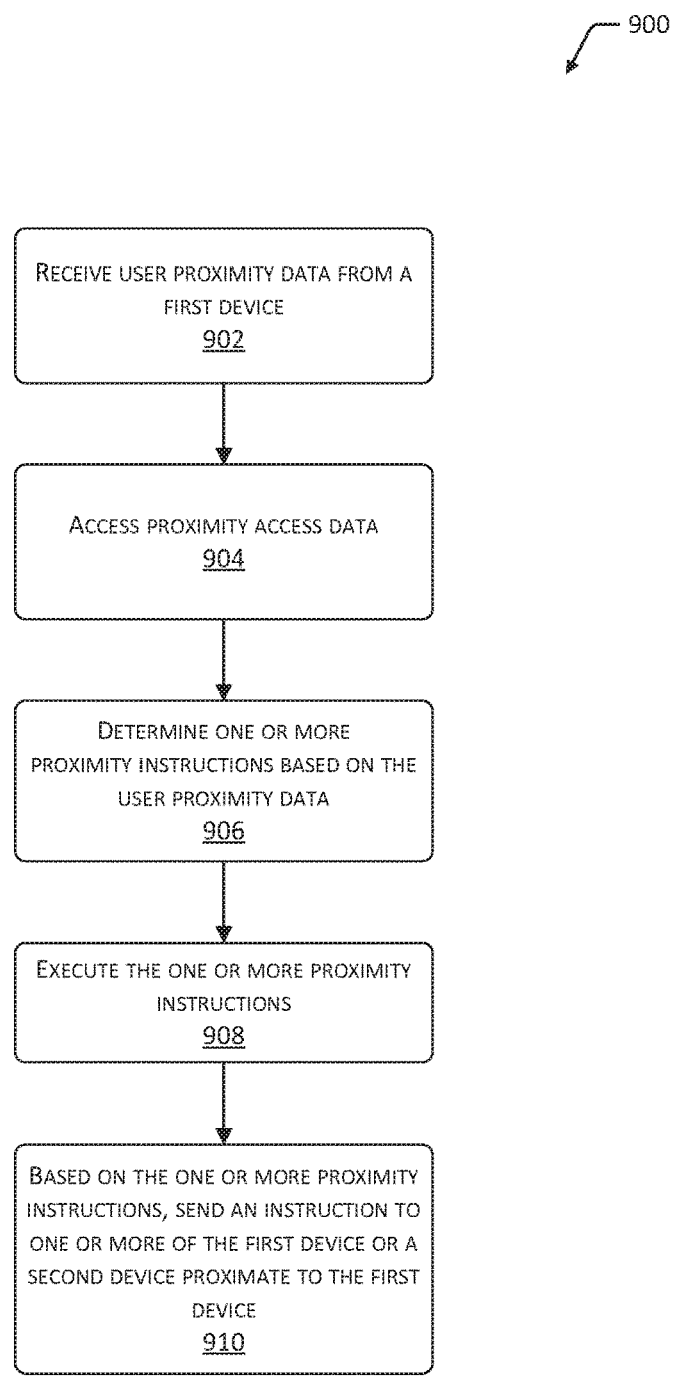
FIG. 9 is a flow diagram of a process of executing one or more proximity instructions based at least in part on user proximity data.

FIG. 9 is a flow diagram 900 of a process of executing one or more proximity instructions based at least in part on user proximity data 124. This process may be implemented by the server 114, the media device 108, the remote control 104, or a combination thereof.

Block 902 receives user proximity data 124 from a first device, such as the remote control 104 or the media device 108. As described above with respect to FIG. 2, the user proximity data 124 is indicative of one or more users 102 being proximate to the first device, a second device, or both the first and second device. For example, the AVR media device 108(3) may be across the room from the television media device 108(1). The user proximity data 124 from the AVR media device 108(3) may indicate that the user 102 is standing in front of (and thus proximate to) the television media device 108(1), but may be far away from the AVR media device 108(3).

Block 904 accesses the proximity action data 130. As described above with respect to FIG. 3, the proximity action data 130 comprises information associating one or more user proximity states 304 with one or more proximity instructions 306. These proximity instructions 306 are configured to perform a particular action when executed.

Block 906 determines one or more of the proximity instructions 306 based at least in part on the user proximity data 124. This determination may comprise determining a correspondence between the user proximity data 124 and the one or more user proximity states 304. One or more of the proximity instructions 306 may then be selected based on the correspondence between the user proximity data 124 and the one or more user proximity states. In one implementation, the user proximity data 124, or a portion thereof, may be compared with the predefined user proximity state 304 in the proximity action data 130. Once a match, either exact or approximate, is determined, the one or more proximity instructions 306 associated with the user proximity state 304 may be determined. For example, the user proximity data 124 may indicate that a proximate user 102 is detected by the one or more sensors 122. This corresponds to the user proximity state 304 of "proximate user detected" which in turn corresponds with the proximity instruction 306 to "stream audio and video content".

Block 908 executes the one or more proximity instructions 306. As described above with respect to FIG. 3, these instructions may be configured to initiate actions on the server 114, the media devices 108, the remote control 104, or combinations thereof. In one implementation, the proximity instructions 306 may be configured to modify distribution of a content stream being sent by the server 114 to the first device or the second device. The modifying may include pausing, terminating, or resuming transmission of the content stream. For example, when the user proximity data 124 indicates the user 102 has left the vicinity of the set top box media device 108(2), streaming of content 110 which is being sent to the media device 108(2) may be stopped. This provides benefits including reducing bandwidth consumption when the user 102 is not able to experience the content (by being absent), and also allows the user 102 to resume consumption where left off upon re-entering proximity.

In some implementations, the user proximity data 124 comprises information indicative of a number of people proximate to the device(s). This quantity information may be used to prioritize or allocate resources at the server 114, on the network 112, on the media devices 108, and so forth. The proximity instructions 306 may be configured to determine a delivery priority based at least in part on the number of people proximate to the device(s). For example, as shown above at 302(9), the media device 108(2) receiving a stream of the content 110 with five users 102 proximate may receive a higher priority from the server 114, the network 112, and so forth, compared to the media device 108(5) which has only a single user 102 proximate.

Transmission of the content 110 may be configured based at least in part on the delivery priority. In one implementation, transmission to a first device proximate to a first number of people is given precedence over transmission to a second device proximate to a second number of people wherein the first number is greater than the second number. In some implementation, configuration of transmission may include setting or modifying one or more quality of service ("QoS") tags associated with the transmission of the content 110. For example, the delivery priority may set QoS tags, which are processed by routers or other data transport devices to prioritize particular pieces of data during transport.

In some implementations particular content 110 may be delivered or presented based at least in part on the user proximity data 124. In one implementation, the user proximity state 304 may specify particular quantities of users 102, and corresponding proximity instructions 306 to present particular advertisements may be provided. For example, a group of users 102(1)-(5) may see an advertisement for an amusement park, while a single user 102(6) may see an advertisement for a dating service.

In another implementation user proximity data 124 indicating presence of one or more identified users 102 may be associated with proximity instructions 306 to present particular content 110. For example, when user 102(1) "Alice" is consuming content 110(1) on one of the media devices 108, an advertisement for cheese may be provided and presented. In comparison, when the user 102(2) "Bob" is also consuming the same content 110(1) on one of the media devices 108, an advertisement for furniture may instead be presented.

The one or more proximity instructions 306 may include initiating one or more maintenance tasks associated with one or more of the devices. For example, when no users 102 are present near the device(s) for a threshold length of time, maintenance tasks may be performed on the device(s). These maintenance tasks may include one or more of sending update files, delivering at least a portion of one or more pieces of content 110 for caching prior to presentation, restarting the device, performing database maintenance, running diagnostic tests, and so forth.

The proximity instructions 306 may be configured to initiate a video chat or other communication session between two or more devices. In one implementation, the instructions may determine connection configuration data designating a destination device. For example, the user 102 may have previously provided configuration data designating the details to establish a video chat with their friend. Based on the connection configuration data, the proximity instructions 306 may initiate a video chat between the device(s) and the destination device. For example, the user 102(1) walking into the room may be greeted by a video chat starting with their friend, who is proximate to his media device 108.

The user proximity data 124 may include information which identifies a particular user 102. The identity of the user 102 may thus be determined. This determination may include receiving a password or code entered on an input device, facial recognition, voice recognition, receiving data from an RFID/NFC tag, and so forth. As described above this identification may be relative (one user is different from another) or absolute (this user is 102(1) "Alice"). The user proximity state 304 may specify a particular identity of the user 102, and corresponding proximity instructions 306 may be provided for that user 102. For example, proximity of the identified user 102(1) "Alice" may result in automatic initiation of a video chat with the user 102(2) "Bob".

The proximity instructions 306 may also be configured to generate a bookmark or modify an existing bookmark associated with a portion of the content 110 presented contemporaneously with the user 102 entering or leaving proximity of the device(s). In some implementations, the bookmark may be associated with the identified particular user 102. For example, user 102(1) "Alice" and user 102(2) "Bob" are watching a movie together, as streamed from the server 114 to the set top box media device 108(2) which presents the audio and video using the television media device 108(1). User 102(1) "Alice" leaves the room to take a phone call, while user 102(2) "Bob" continues to watch. When user 102(1) "Alice" departs the proximity of the set top box 108(2), a bookmark associated with the user 102(1) is generated, indicating the time when she left the room. Later, the user 102(1) "Alice" may resume presentation of the content 110 at the point indicated by the bookmark.

Based on the one or more proximity instructions 306, block 910 may send one or more proximity instructions 306 to one or more of the devices, such as the first device, or the second device which is proximate to the first device. For example, the proximity instructions 306 may be sent to the media device 108(2) which is connected to the network 112, which in turn sends the proximity instructions 306 on to the media device 108(3) using the HDMI interface.

In one implementation, the proximity instructions 306 may be configured to transition one or more devices from a first operating state into a second operating state. For example, the proximity instructions 306 to turn off the media device 108 may be sent from the server 114 to the remote control 104 which in turn transmits appropriate commands to the media device 108 to turn off. The first operating state may comprise a normal operating state while the second operating state may comprise a low power operating state in which the processor or other components are operating at reduced capacity compared to the normal operating state.

Figure 10:
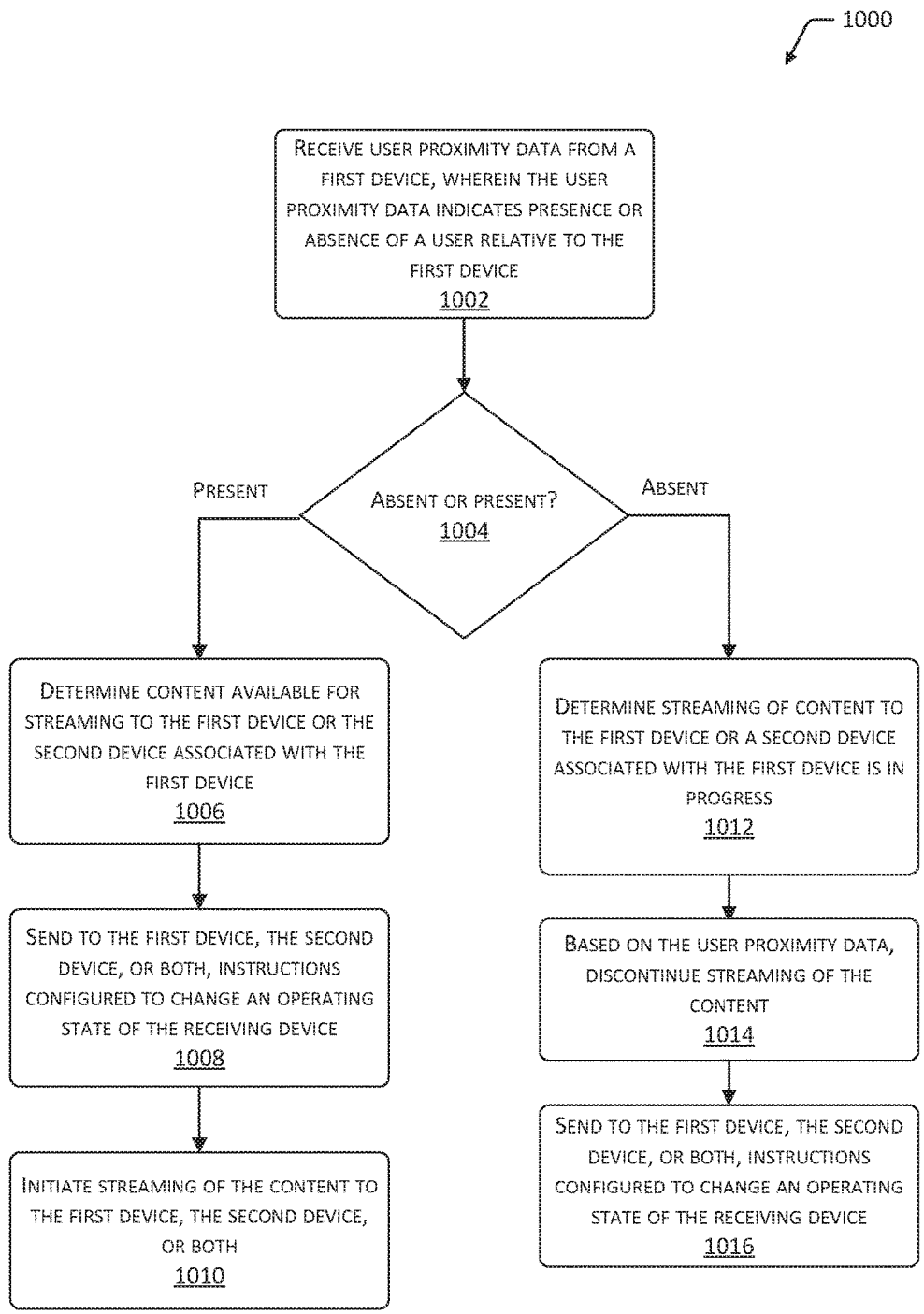
FIG. 10 is a flow diagram of modifying content presentation based at least in part on user proximity data.

FIG. 10 is a flow diagram 1000 of modifying content presentation based at least in part on user proximity data 124. This process may be implemented by the server 114, the media device 108, the remote control 104, or a combination thereof.

Block 1002 receives the user proximity data 124 from one or more devices such as the remote control 104, or the media devices 108. As described above, the user proximity data 124 is indicative of the presence or the absence of the user 102 relative to one or more of the devices.

Block 1004 determines, based on the user proximity data 124, the absence or the presence of the user 102. The determination may be made as to whether any user 102 is in proximity to the devices, or as to whether a particular user 102 is near the devices.

When block 1004 determines the user 102 is present, the process proceeds to block 1006. Block 1006 determines content 110 available for streaming to the device(s) or which has previously been stored on the device(s) and is available for presentation.

In some implementations, block 1008 sends the device(s) proximity instructions 306 configured to perform one or more actions. For example, the server 114 may send the media device 108 proximity instructions 306 to change the operating state. A receiving device, such as the media device 108, executes the instructions. Continuing the example, the media device 108 may change from a low power state to a normal operating state and be configured for presentation of streamed content 110.

Block 1010 initiates streaming of the content 110 to the device(s). For example, now that the media device 108 has resumed a normal operating state and is ready for the content 110, the server 114 may begin sending a stream of the content 110 over the network 112 to the media device 108.

Returning to block 1004, when the user 102 is determined to be absent, the process may proceed to block 1012. Block 1012 determines that streaming of the content 110 is in progress to the media device 108, the remote control 104, or another device.

Based on the user proximity data 124 indicative of an absence of one or more users 102 relative to the media device 108 or the remote control 104, block 1014 discontinues sending at least a portion of the stream of the content 110. For example, the server 114 may stop sending the video portion of the stream, while continuing to send the audio portion. Absence or presence may be based on the one or more users 102 being within a threshold distance of the one or more sensors 122, being detectable by the one or more sensors 122 regardless of distance, and so forth.

In some implementations the streaming may involve one-too-many distribution techniques such as broadcasting, multicasting, anycasting, and so forth. These one-too-many distribution techniques distribute one stream of packets to a plurality of media devices 108 for presentation. In these implementations, the presentation on a particular media device 108 may be discontinued, while the presentation on the other media devices 108 receiving the multicast may continue. Streaming of the multicast data may be discontinued upon the absence of the last user 102. For example, when the last user 102 consuming the multicast walks away from the media device 108 presenting the multicast stream, the entire multicast stream may be discontinued.

Block 1016 sends proximity instructions 306 to one or more of the remote control 104, the media devices 108, the server 114, and so forth. As described above, the proximity instructions 306 may be configured to change an operating state of the receiving device. For example, the media device 108 may receive proximity instructions 306 to transition to a low power state.

Figure 11:
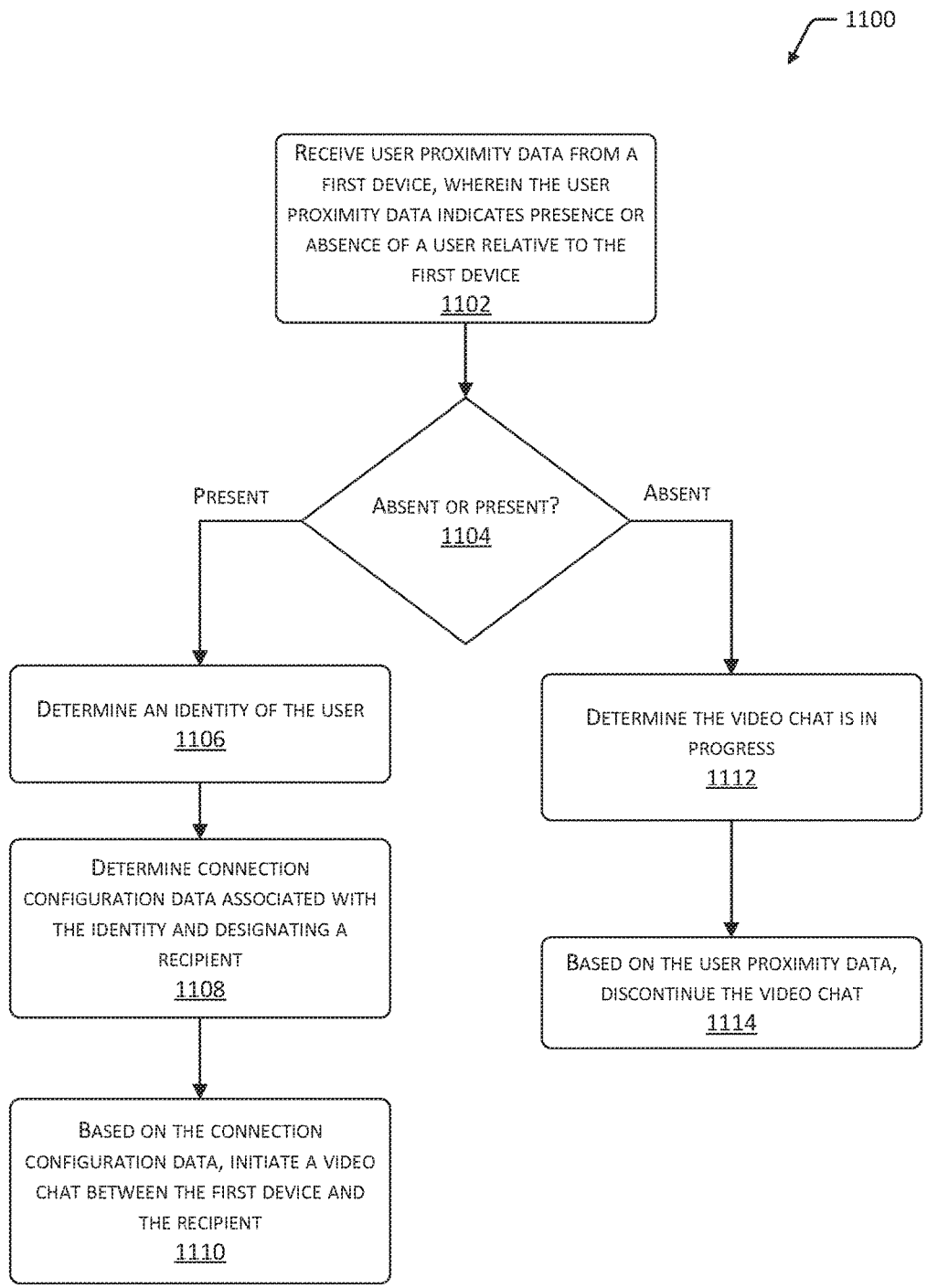
FIG. 11 is a flow diagram of establishing a video chat or other connection based at least in part on user proximity data.

FIG. 11 is a flow diagram 1100 of establishing a video chat or other connection based at least in part on user proximity data 124. This process may be implemented by the server 114, the media device 108, the remote control 104, or a combination thereof.

Block 1102 receives the user proximity data 124 from one or more devices such as the remote control 104, or the media devices 108. As described above, the user proximity data 124 is indicative of presence or absence of the user 102 relative to one or more of the devices.

Block 1104 determines, based on the user proximity data 124, absence or presence of the user 102. The determination may be made as to whether any user 102 is in proximity to the devices, or as to whether a user 102 is near the devices.

When block 1104 determines the user 102 is present, the process proceeds to block 1106. Block 1106 determines an identity of the user 102. This may be a relative identity or an absolute identity. For example, the user proximity data 124 may include an image of the user's 102 face which is sent to the server 114 for facial recognition processing. Based on the image, the identity of the user 102(1) "Alice" may be determined.

Block 1108 determines connection configuration data associated with the identity and designated recipient. The recipient may be a particular user account, device, or combination thereof. The connection configuration data may include account logon information, recipient addressing information, and so forth. For example, the connection configuration data may include information indicating a preferred service and account name for user 102(3) "Charlie" who is friends with user 102(1) "Alice".

Based on the connection configuration information, block 1110 initiates a communication session, such as a video chat, audio chat, text message, and so forth, with a device associated with the recipient. For example, the video chat may be established between the set top box media device 108(2) currently being used by user 102(1) "Alice" and the tablet media device 108(7) currently being held by the user 102(3) "Charlie". In some implementation, the initiation may be contingent on presence of one or more users 102 proximate to their respective devices such as remote controls 104, media devices 108, and so forth. Continuing the example, the video chat from user 102(1) "Alice" to user 102(3) "Charlie" with his tablet media device 108(7) if user 102(3) "Charlie" is not proximate to that media device 108(7).

The video chat connection may also be responsive to changes in the user proximity data 124. In one implementation, should another user 102 who is not previously known or authorized to participate in a video chat be proximate to one of the media devices 108 or the remote control 104, the video chat may be suspended or terminated. In another implementation, the user proximity data 124 may be used to provide a listing of attendees. For example, identification data about the users 102 may be distributed to participants of the video chat.

Returning to block 1104, when the user 102 is absent, the process may proceed to block 1112. Block 1112 determines that the video chat is in progress. This video chat may have been manually initiated, or automatically initiated, based on proximity as described above with respect to block 1110. Block 1114, based at least in part on the user proximity data 124 indicative of absence of the user 102, discontinues the video chat. Continuing the example, when the user 102(1) "Alice" or the user 102(3) "Charlie" leaves the proximity of their respective devices, the video chat is terminated. Should they return to the vicinity of their respective devices, and those devices are so configured, the video chat or other communication session may be initiated again automatically.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method comprising:
    receiving user proximity data from one or more sensors, the user proximity data indicating a location of a first user relative to a first device;
    determining an identity of the first user;
    determining proximity action data associated with the identity of the first user, wherein the proximity action data associates the identity of the first user with one or more corresponding actions;
    initiating a communication session based at least in part on the proximity action data; and
    accessing connection configuration data associated with the first user, wherein the connection configuration data indicates that the communication session is to be initiated with a third device, and the communication session is to be initiated by one or more of the first device or a second device.

2. The method of claim 1, wherein initiating the communication session further includes causing the one or more of the first device or the second device to receive a communication from the third device.

3. The method of claim 1, further comprising:
    determining a lack of the first user near the first device;
    causing the one or more of the first device or the second device to terminate the communication session; and
    causing the one or more of the first device or the second device to one or more of perform a maintenance task or enter a low power state.

4. The method of claim 1, wherein the user proximity data is further indicative of one or more of:
    a number of users near the first device;
    a position of the first user;
    an orientation of at least a part of the first user; or
    detected motion.

5. The method of claim 1, wherein determining the identity of the first user includes one or more of:
    receiving user input indicative of the first user from an input device;
    performing facial recognition based on data determined by the one or more sensors;
    performing voice recognition based on data determined by the one or more sensors;
    detecting a near-field communication device associated with the first user; or
    detecting a radio frequency identification device associated with the first user.

6. The method of claim 1, further comprising:
    determining, based on the user proximity data, one or more of:
    a presence of the first user within a pre-selected distance of the first device;
    an absence of the first user within the pre-selected distance of the first device;
    a length of time associated with the absence;
    the identity of the first user;

a presence of one or more second users within the pre-selected distance of the first device;
a position of the first user; or
a position of the one or more second users.

7. The method of claim 1, further comprising:
determining a first portion of the user proximity data using a first sensor associated with the first device; and
determining a second portion of the user proximity data using a second sensor associated with one or more of the second device or a fourth device in an environment with the one or more of the first device or the second device.

8. The method of claim 1, wherein the connection configuration data indicates a plurality of devices associated with a second user and the plurality of devices includes the third device, the method further comprising:
determining that the second user is proximate to the third device, wherein the communication session is initiated with the third device in response to the second user being proximate to the third device.

9. The method of claim 1, further comprising:
determining proximity of a second user to the one or more of the first device or the second device; and
one or more of suspending or terminating the communication session in response to the proximity of the second user to the one or more of the first device or the second device.

10. A system comprising:
one or more memories storing computer-executable instructions; and
one or more hardware processors configured to execute the computer-executable instructions to:
receive, from one or more sensors, first user proximity data indicative of a first location of a first user relative to a first device;
determine proximity action data for the first user, wherein the proximity action data associates the first user with one or more corresponding actions;
initiate, based at least in part on the proximity action data, a communication session using one or more of the first device or a second device in an environment with the first device; and
access connection configuration data for the first user, wherein the connection configuration data indicates that the communication session is to be initiated with a third device.

11. The system of claim 10, wherein the connection configuration data indicates a plurality of devices associated with a second user and the plurality of devices includes the third device, the system further comprising computer-executable instructions to:
receive second user proximity data indicative of a second location of the second user relative to the third device, wherein the communication session is initiated with the third device in response to the second user being proximate to the third device.

12. The system of claim 10, wherein the one or more sensors include a first sensor associated with the first device and a second sensor associated with the second device, the system further comprising computer-executable instructions to determine the first user proximity data based at least in part on first input from the first sensor and second input from the second sensor.

13. The system of claim 10, further comprising computer-executable instructions to:
determine, using the one or more sensors, an identity of the first user; and
determine the proximity action data and the connection configuration data based on the identity of the first user.

14. The system of claim 10, further comprising computer-executable instructions to:
receive second user proximity data indicating an absence of the first user relative to one or more of the first device or the second device; and
discontinue the communication session.

15. The system of claim 10, further comprising computer-executable instructions to:
receive second user proximity data indicating an absence of a second user relative to the third device; and
discontinue the communication session.

16. The system of claim 10, further comprising computer-executable instructions to:
determine second user proximity data indicative of a second location of a second user relative to the one or more of the first device or the second device;
determine that the second user is not authorized to access the communication session; and
in response to the second user proximity data, one or more of suspend or terminate the communication session.

17. A method comprising:
receiving first user proximity data from a first sensor associated with a first device;
based on the first user proximity data, determining a first location of a first user relative to one or more of the first device or a second device in an environment with the first device;
determining proximity action data associated with the first user, wherein the proximity action data associates the first user with one or more corresponding actions;
initiating a communication session based at least in part on the proximity action data; and
accessing connection configuration data for the first user, wherein the connection configuration data indicates that the communication session is to be initiated with a third device.

18. The method of claim 17, wherein the connection configuration data indicates a plurality of devices associated with a second user and the plurality of devices includes the third device, the method further comprising:
determining, based on second user proximity data, a second location of a second user relative to the third device, wherein the communication session is initiated with the third device in response to the second user being proximate to the third device.

19. The method of claim 17, further comprising:
determining an identity of the first user; and
determining one or more of the proximity action data or the connection configuration data based on the identity of the first user.

20. The method of claim 17, further comprising:
determining second user proximity data indicative of a second location of a second user relative to the one or more of the first device or the second device; and
in response to the second location, discontinuing, the communication session.

* * * * *